United States Patent

Jackson

[15] 3,646,610
[45] Feb. 29, 1972

[54] FIBER GLASS REINFORCED GOLF SHAFT

[72] Inventor: Carl Thomas Jackson, Fairview, Pa.
[73] Assignee: True Temper Corporation, Cleveland, Ohio
[22] Filed: Mar. 10, 1969
[21] Appl. No.: 805,753

Related U.S. Application Data

[63] Continuation-in-part of Ser. No. 475,112, July 27, 1965, abandoned, and a continuation-in-part of 666,342, Sept. 8, 1967, abandoned.

[52] U.S. Cl. ..........................273/80 R, 138/129, 138/140, 161/59, 161/176, 161/178, 273/DIG. 7
[51] Int. Cl. .......................................................A63b 53/10
[58] Field of Search.....................161/93, 95, 141, 162, 174, 161/175, 176, 193, 47, 55, 57–59, 60, 142, 143, 178, DIG. 4; 273/80, 80 B, DIG. 7; 87/1; 156/148, 147; 138/129, 130, 132, 140, 141, 145, 153, 172, 174; 117/26

[56] References Cited

UNITED STATES PATENTS

| | | | |
|---|---|---|---|
| 2,234,560 | 3/1941 | Keyes | 57/140 |
| 2,573,361 | 10/1951 | Rodgers, Jr. et al. | 161/176 |
| 2,713,337 | 7/1955 | Wurster | 273/DIG. 7 |
| 2,726,185 | 12/1955 | Howald | 273/DIG. 7 |
| 2,934,345 | 4/1960 | Scott | 273/80 B |
| 3,260,010 | 7/1966 | DuBois | 138/141 |

FOREIGN PATENTS OR APPLICATIONS 210,557   3/1956   Australia...........................273/DIG. 7

Primary Examiner—William J. Van Balen
Assistant Examiner—Linda Koeckert
Attorney—J. H. Slough

[57] ABSTRACT

A fiber glass reinforced golf shaft has layers of fiber glass strands disposed longitudinally or both longitudinally and circumferentially of the shaft and enclosed in a resinous binder, some or all of the layers being provided with a layer of random-oriented, short lengths of chopped, fiber glass filament which are also enclosed within said resinous binder.

24 Claims, 17 Drawing Figures

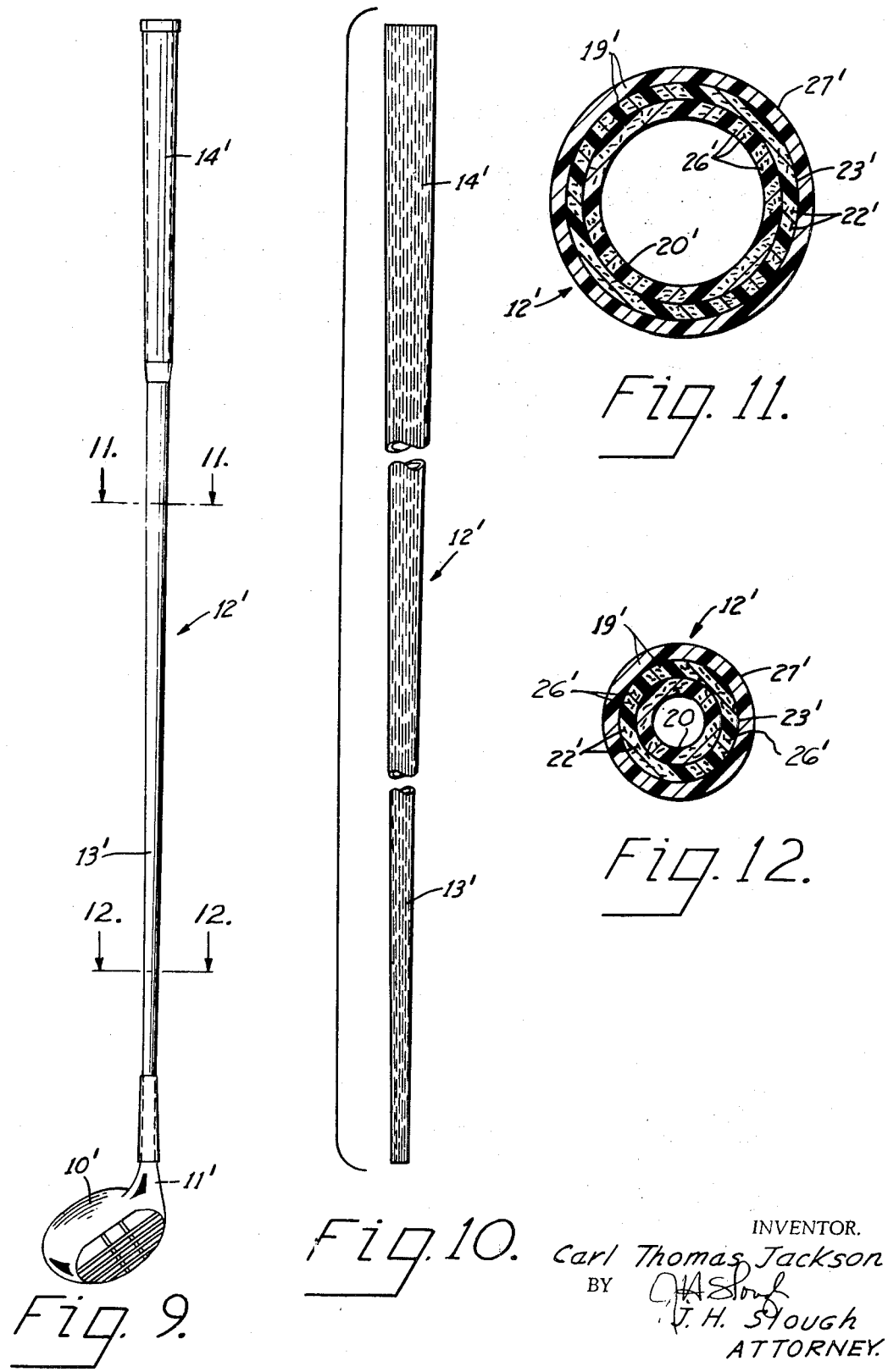

INVENTOR.
Carl Thomas Jackson
BY
J. H. Stough
ATTORNEY.

FIBER GLASS REINFORCED GOLF SHAFT

This application is a continuation-in-part of my copending United States applications, Ser. No. 475,112, filed July 27, 1965, and Ser. No. 666,342, filed Sept. 8, 1967, both now abandoned.

This invention relates to fiber glass rods and more particularly to tubular shafts of fiber glass particularly adapted for use in golf clubs and having the design characteristics of strength, flex, and torsion at least to the extent achieved in known steel golf shafts, the desired weight limitations being observed.

Where the entire shaft is constituted of bonded glass fibers and the shaft comprises longitudinally extending fibers bonded together, in use, the shaft is subject to longitudinal fracture.

It is an object of this invention to produce a fiber glass shaft for golf clubs, fishing rods, or the like, which is of the desired size, weight, flexibility, and torsional strength resistant to fracture, collapse, etc.

A further object is to provide a shaft of the type related which will have increased shear strength.

A still further object is to provide a shaft of the type related in which the shaft is of tapered tubular form and of uniform cross-sectional area throughout its length.

A further object of the present invention is to provide a fiber glass reinforced shaft having great strength with respect to both lateral bending of the shaft and the application of torsional forces, or any combination of these forces, and which can be provided with any desired degree of stiffness or flexibility.

Another object is to provide such a shaft wherein longitudinal strands of fiber glass reinforcement are securely reinforced by circumferentially directed strands thereby preventing longitudinal splitting or fracturing of the shaft.

Still another object of the present invention is to provide means which efficiently lock superimposed layers of strands together to prevent separation thereof and transmit forces between the layers.

Yet another object of the invention is to provide a shaft as set forth above having a multiplicity of short fiber glass filaments distributed throughout the shaft in random orientation locking both longitudinal and circumferentially directed strands together and evenly distributing and reinforcing stresses applied throughout the shaft.

Other objects of the inventions and a number of the advantages thereof will be understood from the following description of the invention as disclosed in the accompanying drawings, in which said drawings:

FIG. 9 is an elevational view of a golf club of the so-called wood type embodying another form of the invention;

FIG. 10 is an enlarged elevational view of the form of the shaft of FIG. 9, portions thereof being broken away;

FIG. 11 is an enlarged, transverse section taken along the line 11—11 of FIG. 9;

FIG. 12 is an enlarged, transverse section taken along the line 12—12 of FIG. 9;

Figures 1, 2, 3:
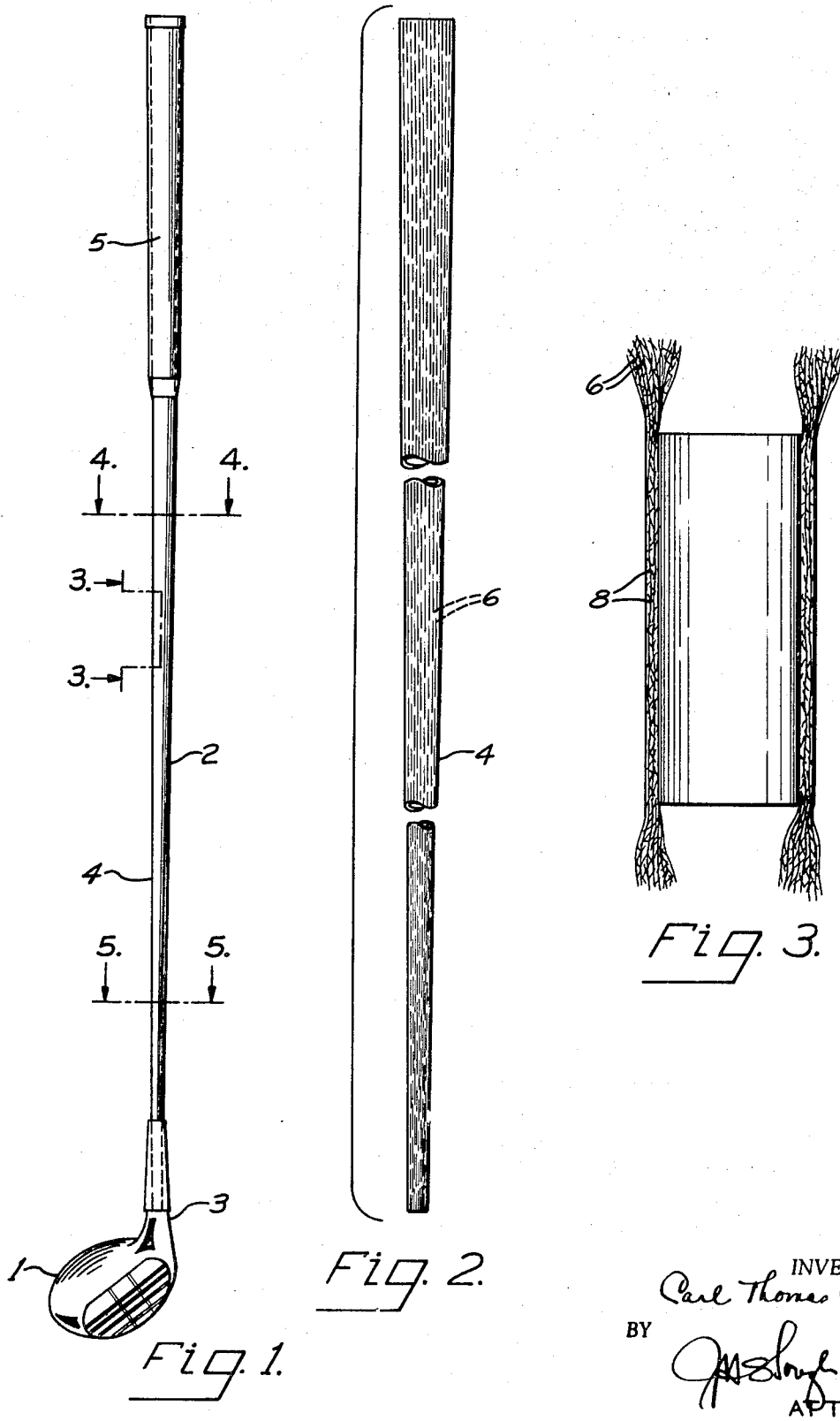
FIG. 1 is an elevational view of a golf club of the so-called "-wood" type embodying the invention.
FIG. 2 is an enlarged elevational view of a first form of the shaft of the invention, portions being broken away.
FIG. 3 is an enlarged section view taken on the line 3—3 of FIG. 1 with the end portions shredded to show the construction.
Figure 4:
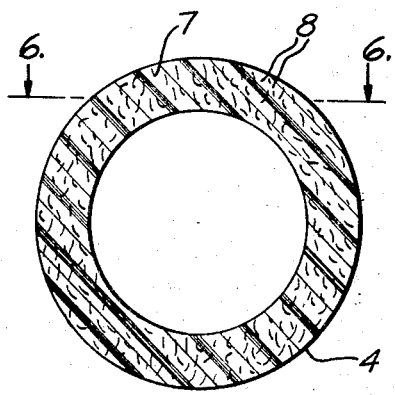
FIG. 4 is a cross-sectional view taken on the line 4—4 of FIG. 1.

In accordance with the preferred form of the present invention, the golf shaft of my invention is disclosed in a golf club of the so-called wood type although it is obvious that the same type shaft can be employed in any golf club, whether the same be a wood, "iron," "putter," or in a fishing rod or other rod. This shaft in the form of FIGS. 1 to 6, inclusive, is made up of a plurality of glass fibers, all of which are of the same length and extend longitudinally of the shaft and are bonded together by a suitable binder, such as resins, i.e., epoxies, polyesters, phenolics, or the like. The shaft, as shown, is preferably tubular and tapered throughout. The longitudinal fibers are continuous and are uniformly distributed about the axis and throughout the length of the shaft and are bound together by the binder and by chopped fiber glass particles or chopped filaments; said particles are dispersed at random in different directions throughout the length of the shaft, the chopped particles being preferably of greater length than width.

The references to "choppings," chopped "particles," chopped "filaments," or chopped "fibers" as used herein refer to short lengths or particles of substantially continuous filament which are in all cases of a length less than the circumference of the shaft and preferably less than one-half of the circumference of the shaft wherefore the choppings as disclosed in the drawings are adapted to be disposed at random with respect to the longitudinal strands of fiber glass. Such terms are intended to exclude windings and staple fibers. The length of the chopped particles or chopped filaments is such that they will be oriented in an infinite number of different directions and positions when blown or otherwise dispersed upon the shaft in a random manner.

In the variant forms of the invention shown in FIGS. 8–17 the shaft comprises inner and outer layers formed of a plurality of longitudinally extending glass fibers and intermediate layers formed of either oppositely helically wound, bidirectional torsion resistant glass fibers or longitudinal fibers. Chopped fiber glass particles are disposed between the respective layers, and are distributed at random, lying in different directions securing the different layers together and securing the separate longitudinally extending glass fibers together and the helically wound fibers together.

It will be apparent that one may depart from the forms of the invention shown herein and still produce a desirable shaft or tube embodying many of the advantages of the forms shown. For instance, other and additional layers could be incorporated into the shaft, the chopped glass fiber particles could be interspersed throughout the shaft or applied only to certain layers or surfaces thereof, the shaft could be solid or of different form or taper, depending upon the mandrel, etc., and the use of the shaft, but if the common features of the forms of the invention are used, the shaft will have improved flexure, torsional strength and torsional resistance characteristics.

In FIG. 1 the golf club shown consists of a head 1 and a shaft 2. The head has a hosel 3 into which the shaft is fitted in any preferred manner. The shaft consists of a shank end 4 and a grip end 5. The shaft is formed from a plurality of continuous full-length tensioned longitudinally extending glass strands, threads or fibers 6 and chopped short lengths 8 of fiber glass disposed at random, the same being bonded or secured together by a suitable thermosetting binder 7, such as an epoxy or polyester. The longitudinal threads 6 are preferably substantially "dry" threads precoated or impregnated with resin or binder prior to application of the fibers longitudinally of a tapered mandrel. The chopped short lengths 8 of fiber glass are dry threads and blown or in other manner dispersed at random over the surface of the longitudinal threads when disposed on a mandrel (not shown) and lie further at random between the said longitudinal threads wherefor, after winding the same with cellophane tape, as well known in the art, for geometric security, upon passage of the covered mandrel through a heat tunnel or curing oven (not shown) the resin or binder will set and the shaft of FIG. 1 will be formed. The particular method and apparatus preferably employed for forming the shaft of this invention is described in copending application assigned to assignee of the present invention, said application bearing Ser. No. 655,919 filed July 25, 1967, and constituting no essential part of the present invention.

Figure 8:
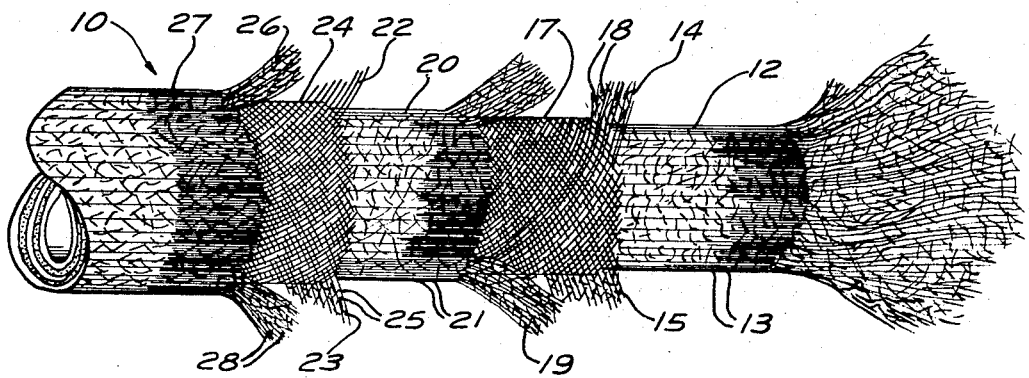
FIG. 8 is an enlarged sectional view of another form of the invention, certain overlying layers of a laminated shaft being cut away to expose underlying layers thereof, and certain portions being exposed and shredded to disclose the structural context thereof.

In the form of my invention shown in FIG. 8, the shaft 10 comprises a plurality of continuous full-length longitudinally extending fibers 11 constituting the inner lining 12 of the shaft; these fibers are preferably precoated with resin etc., and are dispersed similarly to the longitudinal fibers of FIG. 1 on the mandrel (not shown) and chopped dry short lengths of glass fibers 13, are disposed at random and in multidirections over the surface of the said fibers 11. A plurality of interlaced, spirally wound fiber glass lengths 14, 15, extend the length of the shaft and are disposed over the longitudinally extending fiber glass lining 12. Further glass choppings 18, similar to chopped glass fibers 13, are dispersed over the surface of the spirally wound shaft portion 17. An intermediate layer 20 of tensioned longitudinally disposed glass fibers 19, preferably precoated with resin, etc., extending the full length of the shaft is provided which is disposed over the spiral-wound shaft portion 17 and is provided with chopped dry short lengths of glass fibers 21 disposed, at random, similarly to the "chop" 13, over the fibers 19. As shown, a layer 24 of spirally wound fiber glass lengths 22, 23 is disposed over the layer 20, and an outer layer 27 composed of longitudinal fibers 26 having a chop 28 dispersed thereon is disposed over the layer 24. After wrapping the same with cellophane tape, the said resin-coated glass fiber structure is heated, and the same forms a shaft of integral construction, having improved load-bearing and torsion resistance.

The bend of a golf shaft is known to require flexure, and numerous efforts have been made to build into a shaft the desired "stiffness," shafts being made either relatively stiff, or of medium flexibility, or greater flex, according to the requirements of the golfer. Furthermore, a golf shaft must withstand torque or twisting forces. It will be noted that the present invention provides both advantages. The longitudinal threads and their dispositioning provides the desired flexure and the chopped fibers disposed at random in variant directions provides support of the counterrotational forces. The chopped fibers not only lock the laminates together but, being disposed at random in many different variant directions, also oppose shear forces tending to fracture the shaft.

In the form of my invention disclosed herein in FIG. 1 it is preferred that the longitudinal fibers constitute approximately 70 percent of the shaft content; the chopped glass fibers approximately 10 and 13 percent of the shaft content; and the resin or binder approximately 20 to 22 percent thereof. In the form of the invention disclosed in FIG. 8, the longitudinal fibers preferably are proportioned in a ratio of 2½:1 to the helical fibers but the longitudinal fibers constituting the outer surface of the shaft represent but an approximate ratio of ¾:1 to the longitudinal fibers constituting the inner surface of the shaft and a ratio of 1:1 to the helical fibers.

It will be noted that, in all forms disclosed herein, the resin-impregnated longitudinally disposed glass fibers are interlaced with chopped glass fiber random threads tying the longitudinal rovings or threads together and where other layers, helical or otherwise are used, tying the same together and to the longitudinal rovings for additional multidirectional strength.

It will also be noted that the preferred shaft has been constructed according to my invention in which the total shaft weight is 0.31No. This weight was distributed in said shafts as follows:

| | | |
|---|---|---|
| Longitudinal fibers | | 0.17 # |
| Outer layer | 0.07 # | |
| Middle layer | 0.06 # | |
| Inner layer | 0.04 # | |
| Helical fibers | | 0.07 # |
| Chopped fibers | | 0.01 # |
| Resin or binder | | 0.06 # |

According to the forms of the present invention shown in FIGS. 9–17, a golf shaft is also disclosed in a golf club of the so-called wood type although it is obvious that the same shaft or a shaft embodying the same principles of construction can be employed in any golf club whether the same be a wood, iron, putter, or in a fishing rod or other rodlike or tubular article.

Referring now to the drawings and particularly to FIG. 9, the golf club disclosed comprises a head 10' having a hosel 11' into which there is fitted the lower end of an elongated, tapered shaft 12'. The shaft 12' is secured to the hosel 11' in any suitable or known manner, the same constituting no part of the present invention. The shaft 12' comprises, generally, a shank end 13' and a relatively larger grip end 14'.

Figure 13:
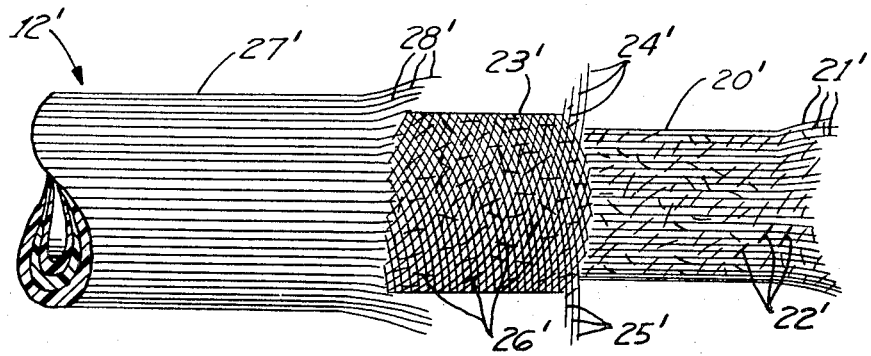
FIG. 13 is an enlarged side view of a portion of the shaft of FIGS. 9—12, certain layers thereof being partially removed to expose underlying layers and certain portions being shredded to disclose the structure thereof.

As shown in FIGS. 11–13, the shaft 12' is formed from layers of fiber glass strands which said strands are preferably laid upon a mandrel or elongated tapered form whereby the resulting shaft is of the proper elongated, tapered shape. At least some of the fiber glass strands are preferably initially wetted or permeated with a suitable uncured thermosetting binder such as an epoxy or polyester whereby upon curing of the resin, the fiber glass reinforcing strands or filaments are all joined and locked together, imbedded within a tubular body of the hardened resin.

As best seen in FIG. 13, a first or inner layer 20' of fiber glass comprises a plurality of longitudinally disposed strands 21' which are circumferentially uniformly distributed about the mandrel upon which the shaft is formed. The strands 21' are preferably initially permeated with the uncured thermosetting resin whereby the outer surface of the layer 20' is sufficiently moist or sticky to receive a multiplicity of short, chopped fiber glass filaments 22' and cause them to adhere thereto. The chopped fiber glass filaments 22' are preferably dry and are blown or in any other suitable manner dispersed evenly over the outer surface of the layer 20' in random orientation. A plurality of fiber glass strands 24' and 25' are spirally wound or braided over the chopped filaments 22' to form an intermediate layer 23' of fiber glass reinforcement. These strands may also be permeated with the uncured resin whereby the outer surface thereof is sufficiently moist or sticky to receive and hold a multiplicity of chopped filaments 26' disposed evenly and in random orientation. A final layer 27' of longitudinally disposed strands 28' is provided over the intermediate layer 23' and the layer of chopped filaments 26'. It will be readily understood that with all of the aforesaid strands and filaments laid upon the mandrel, the resin is then cured in any suitable manner such as that suggested in the aforementioned copending application. As shown in the section of FIGS. 11 and 12, the resulting shaft is laminated and comprises inner, intermediate, and outer layers of fiber glass strands interlocked by layers of short, chopped fiber glass filaments in random orientation, all of said fiber glass being bonded together by a suitable resin indicated at 19'.

Figure 14:
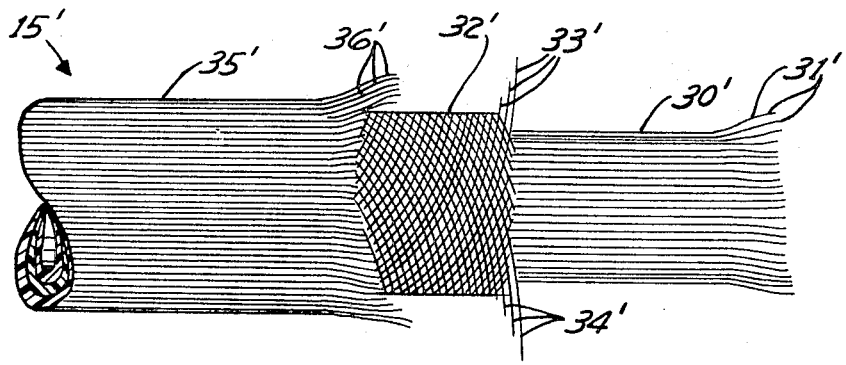
FIG. 14 is a view similar to FIG. 13 of another form of the invention.

FIG. 14, which shows another form of the invention, differs from the foregoing embodiment in that no chopped fibers are applied to any of the layers. In this second form, a shaft 15' is provided with an inner layer 30' of longitudinally disposed fiber glass lengths or strands 31', an intermediate layer 32' of spirally wound fiber glass strands 33' and 34', and an outer layer 35' of longitudinally disposed fiber glass strands 36'. As in the foregoing embodiments, all of the fiber glass reinforcement is bonded together by a mass or body of suitable resin in a cured, hardened state.

Figure 5:
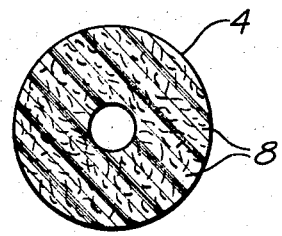
FIG. 5 is a cross-sectional view taken on the line 5—5 of FIG. 1.
Figure 6:
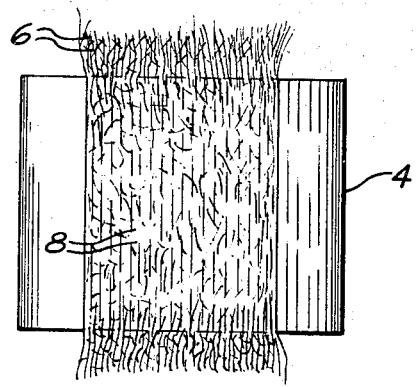
FIG. 6 is a view of the portion of the shaft of FIG. 4 as shown from the line 6—6 thereof, as it would appear with the bonding medium removed in part.
Figure 7:
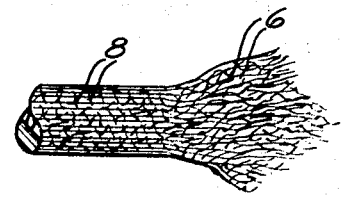
FIG. 7 is a view of a portion of the shaft of FIG. 5 as it would appear with the bonding medium removed.
Figure 15:
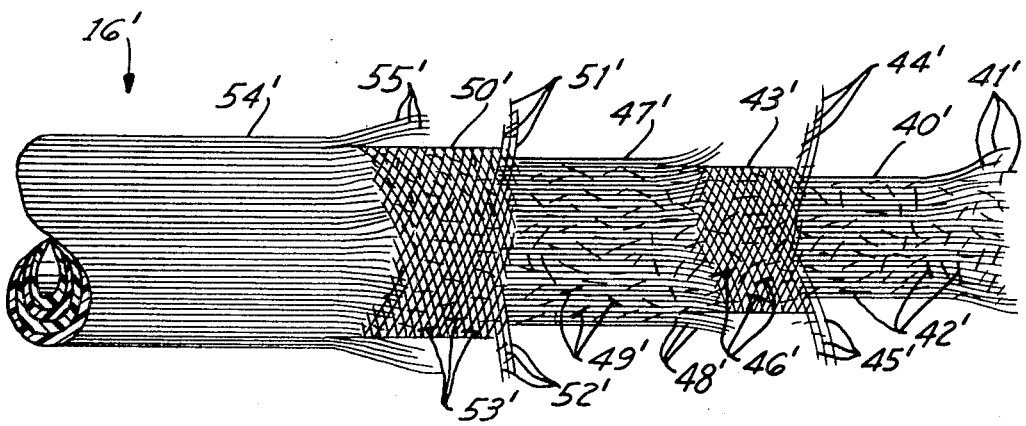
FIG. 15 is a view similar to FIG. 13 showing another form of the invention.

The form of the invention illustrated in FIG. 15 comprises a shaft 16' which is similar to the first form shown in FIG. 5 with the exception that extra layers of longitudinally disposed and spirally wound strands are provided. The shaft 16' comprises a inner layer 40' of longitudinally disposed strands 41' covered by random oriented, chopped filaments 42'. The layer 40' is encased by a first intermediate layer 43' of spirally wound fiber glass strands 44' and 45' having disposed on the outer surface thereof random-oriented chopped fiber glass filaments 46'. Over the layer 43' there is provided an intermediate layer 47' of longitudinally disposed, fiber glass strands 48' having chopped filaments 49' disposed on the outer surface thereof in random orientation. A second intermediate layer 50' of spirally wound fiber glass strands 51' and 52' is provided over the layer 47', said layer 50' having chopped filaments 53' disposed on the outer surface thereof. A final outer layer 54' of longitudinal strands 55' encases all of the foregoing layers. It will be understood that all of said layers are unitarily bonded together in the manner set forth above.

Figure 16:
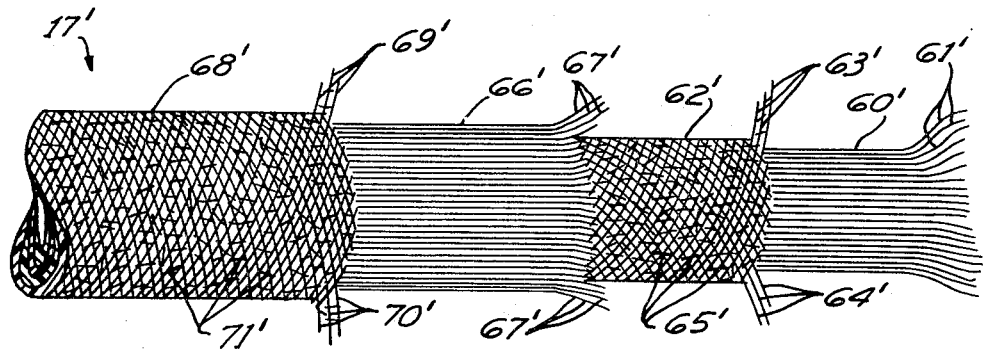
FIG. 16 is a view similar to FIG. 13 showing another form of the invention.

In the embodiment of the invention as shown in FIG. 16, a shaft 17' comprises an inner layer 60' of longitudinally disposed fiber glass strands 61'. The layer 60' is encased in a layer 62' of spirally wound or braided fiber glass strands 63' and 64', the spirally wound layer 62' being covered by short, chopped fiber glass filaments 65' disposed in random orientation. There is then applied a second layer 66' of longitudinally disposed fiber glass strands 67' which said layer 66' is, in turn, covered by a layer 68' of spirally wound or braided fiber glass strands 69' and 70' covered by chopped filaments 71' disposed in random orientation. As in the foregoing forms of the invention, all of the strands and filaments are unitarily joined and locked together by a resinous binder.

Figure 17:
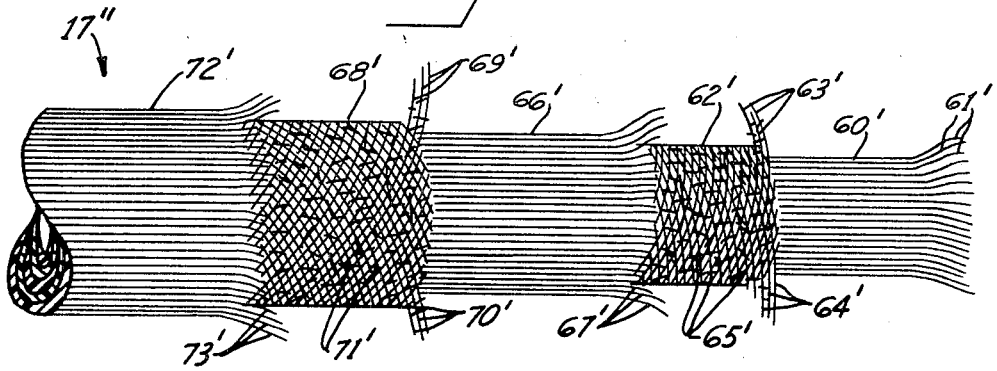
FIG. 17 is a view similar to FIG. 13 showing still another form of the invention.

The form of the invention shown in FIG. 17 shows a shaft 17" which is identical with the shaft 17' of FIG. 16 with respect to all parts thereof with the exception that there is added thereto a final layer 72' of longitudinally disposed fiber glass strands 73'.

It will be understood that the resin may be applied to the fiber glass strands in any suitable manner during the manufacture of the rods, tubes, or shafts. For example, certain of the layers of longitudinal or spirally wound layers may be initially wetted with an uncured resin in a liquid state before applying them to the mandrel, or some or all of the strands may be of the preimpregnated type which is commercially available and known in the art. Prior to or during the curing process, the resin from the impregnated layers permeates and impregnates the remaining strands and filaments whereby the fiber glass becomes imbedded in a body of resin.

As disclosed in the above mentioned copending application, the longitudinal and spirally wound fiber glass strands are applied to the mandrel under some tension, and the same is wrapped with a cellophane tape (not shown) prior to curing of the resin whereby all of the strands and filaments are compressed firmly together before the resin is cured. This brings each strand and each filament in close association with adjacent strands and filaments whereby they all tend to lock together and reinforce each other in the body of cured resin. In the form illustrated in FIG. 14, the layers 30' and 35' of longitudinal strands provide lateral bending strength to the shaft, with torsional reinforcement being afforded by the layer 32' of circumferentially directed fiber glass strands. The longitudinal and spirally wound strands, because of their angular relationship to each other, provide reinforcement for each other whereby both lateral and torsional stresses are distributed and absorbed by the different layers.

In the other embodiments of FIGS. 9–13 and 15–17, the short lengths of chopped fiber glass filaments further provide a multiplicity of small reinforcing elements which bind the separate layers and individual strands together, transmitting forces and stresses between them and distributing shock in many different directions without interfering with the essential function of each layer. Therefore, any shock or stress suddenly applied to the shaft in any direction is evenly distributed and absorbed throughout the shaft regardless of whether the stress or shock tends to bend the shaft laterally, twist the same about its own axis, or both bend and twist the shaft at the same time. The chopped filaments offset any tendency of braided and longitudinal layers to separate by binding them together radially as well as longitudinally and circumferentially of the shaft. It will be noted that although the chopped filaments are blown or otherwise applied to the shaft in random orientation, no matter how a particular individual filament orients itself, it is always disposed at an oblique angle to some adjacent strands, either a longitudinal strand or a spirally wound strand. It will be further noted that the amount of chopped filaments applied can be varied to determine and control the stiffness or flexibility of the shaft, which of course, is also determined by the total number of layers of strands and filaments applied.

The resin used in the manufacture of the foregoing shafts may be applied to the fiber glass strands in any suitable manner. One very satisfactory manner is disclosed in the above mentioned application, Ser. No. 655,919, but other methods may be used. The reference herein to spirally winding the lengths of strands includes the process of braiding the strands over the mandrel in a manner and by mechanism well known in the art.

What I claim is:

1. A glass rod comprising a plurality of longitudinally extending glass fibers, each extending the full length of the rod, a plurality of short, glass fiber choppings disposed over the longitudinal fibers, said longitudinally extending glass fibers unitarily joined to said choppings and each other by a binder, said choppings laying at random in variant directions with respect to the longitudinally extending fibers and joined thereto at various angles by said binder.

2. A glass rod as claimed in claim 1, wherein the longitudinally extending fibers are uniformly distributed about the axis and throughout the length of the rod and are bound together by the said binder and by the said choppings.

3. A glass rod as claimed in claim 1, wherein the longitudinally extending fibers are uniformly distributed about the axis and throughout the length of the rod and are bound together by the said binder and by the said choppings and in which said choppings are preferably of greater length than diameter.

4. A glass rod as claimed in claim 1, wherein the longitudinally extending fibers form an inner and an outer layer of said rod and an intermediate layer of helically wound glass fibers forms an intermediate layer therebetween, and said choppings are disposed between the respective layers.

5. A golf shaft comprising a head having a hosel and a tubular shaft having a shank portion at one end fitted in said hosel and a grip end, said shaft comprising a plurality of longitudinally extending glass fibers and a plurality of random-distributed choppings of fiber glass, said longitudinally extending glass fibers and said choppings being unitarily joined by a binder, the shaft tapering throughout its length.

6. A glass rod as claimed in claim 1 in which the longitudinally extending threads are pretensioned and disposed to provide a predetermined uniformity of flexure and the glass fiber choppings provide support of the counterrotation force.

7. A hollow rod comprising a layer of longitudinally extending glass fibers distributed evenly about the axis of the rod, a multiplicity of short, glass fiber choppings disposed over the longitudinal fibers, said longitudinally extending glass fibers being unitarily joined to said choppings and each other by a binder, said choppings disposed at random in variant directions with respect to the longitudinally extending fibers and joined thereto at various angles by said binder.

8. A fiber glass reinforced shaft comprising a plurality of longitudinally extending, parallel fiber glass strands distributed about a longitudinal axis; a plurality of helically wound fiber glass strands disposed over said longitudinally extending strands; a multiplicity of short, chopped fiber glass filaments dispersed in random orientation over at least one of said plurality of strands for connecting said strands at various angles; and a hardened binding material unitarily joining all of said strands and filaments.

9. A shaft as set forth in claim 8: said longitudinally extending strands defining a tube and comprising an inner layer of a hollow shaft.

10. A shaft as set forth in claim 8 wherein said chopped filaments are dispersed over said longitudinally extending strands.

11. A shaft as set forth in claim 8 wherein said chopped filaments are dispersed over said helically wound strands.

12. A shaft as set forth in claim 8 wherein said chopped filaments are dispersed over both said longitudinally extending strands and said helically wound strands.

13. A fiber glass reinforced tubular shaft comprising an inner layer of longitudinally extending fiber glass strands, each strand extending the full length of said shaft, said strands being evenly distributed circumferentially around a longitudinal axis; an intermediate layer of helically wound fiber glass strands disposed over said first layer; a second layer of longitudinally extending fiber glass strands, each strand extending the full length of said shaft, said strands being evenly distributed in a circumferential direction around said intermediate layer; a multiplicity of short, chopped fiber glass filaments dispersed in random orientation between at least two adjacent layers for connecting the strands of said layers at various angles and transmitting forces between said layers; and a hardened binding material unitarily joining all of said strands and filaments whereby said strands and filaments are locked together and stress applied to any one strand or filament is transmitted to other strands and filaments lying in different directions.

14. A shaft as set forth in claim 13: said chopped filaments being dispersed in random orientation between said inner and intermediate layers and between said intermediate and said second layer of longitudinally extending strands.

15. A shaft as set forth in claim 13: said chopped filaments being dispersed in random orientation between said intermediate and said second layer of longitudinally extending strands.

16. A fiber glass reinforced, plastic tubular golf shaft comprising an inner layer of longitudinally extending fiber glass strands extending the full length of said shaft and being evenly distributed circumferentially around a longitudinal axis; an intermediate layer of helically wound fiber glass strands disposed over said first layer; a second layer of longitudinally extending fiber glass strands extending the full length of said shaft and being evenly distributed circumferentially around said intermediate layer; a second layer of helically wound fiber glass strands disposed over said second layer of longitudinally extending strands; a multiplicity of short, chopped fiber glass filaments dispersed in random orientation over said helically wound layers; all of said strands and filaments being impregnated with a resinous binder in a cured state whereby said strands and filaments are unitarily joined and locked together and stress applied to any one strand or filament is transmitted to other strands and filaments lying in different directions.

17. A golf shaft as set forth in claim 16: said shaft having an outermost layer of longitudinally extending fiber glass strands extending the full length of said shaft, said outer layer being impregnated with said resinous binder.

18. A golf shaft as set forth in claim 16: wherein said chopped fiber glass filaments are dispersed over said layers of longitudinally extending strands.

19. A glass rod as claimed in claim 1: said glass fiber choppings comprising fiber glass filaments having a length less than the circumference of said rod.

20. A golf shaft as set forth in claim 5: said choppings of fiber glass comprising fiber glass filaments having a length less than the circumference of said rod.

21. A hollow rod as set forth in claim 7: said glass fiber choppings comprising fiber glass filaments having a length less than the circumference of said rod.

22. A shaft as set forth in claim 8: said chopped fiber glass filaments having a length less than the circumference of the shaft.

23. A shaft as set forth in claim 13: said chopped fiber glass filaments having a length less than the circumference of said shaft.

24. A golf shaft as set forth in claim 16: said chopped fiber glass filaments having a length less than the circumference of said shaft.

* * * * *